Sept. 7, 1965         A. C. CROWLEY         3,205,486
DIGITAL ANNUNCIATOR SYSTEM
Filed Nov. 2, 1959                     2 Sheets-Sheet 1

INVENTOR.
Arthur C. Crowley
BY
C. M. McKnight
ATTORNEY 3,205,486
DIGITAL ANNUNCIATOR SYSTEM
Arthur C. Crowley, Tulsa, Okla., assignor to Paul King Company, Tulsa, Okla., a sole proprietorship
Filed Nov. 2, 1959, Ser. No. 850,414
5 Claims. (Cl. 340—213)

The present invention relates to a digital annunciator system and more particularly, but not by way of limitation, to an annunciator system adapted to indicate which of a plurality of monitored channels has malfunctioned and to continue to indicate that particular channel after a whole unit and its power source have been automatically shut down.

It is well known in the monitoring of mechanical or machinery operations to provide an electrical annunciator system which will indicate a certain indicia in response to the actuation of one of a number of monitored channels. Actuation of many of the present day systems may be manual, such as an electric cash register, whereas, other systems respond automatically to a source of trouble to give a visual and an auditory alarm which continues until the system is cleared or the trouble is removed by an attendant. However, systems of the latter type require the presence of an attendant to shut off the alarm if the condition is not dangerous or to alleviate the trouble source by any appropriate means. If the trouble that is upsetting the system is of such a nature that it cannot be cleared immediately, the attendant then takes steps to shut the machinery or process down until the necessary repairs can be undertaken. The latter method of monitoring machinery operation is not feasible, particularly when the machinery is in a remote location. All types of visual and auditory alarms may be given, but if no one is in attendance or if the equipment is located in such a remote location with respect to the machinery, it may continue unheeded and result in the destruction or damage of the equipment.

Furthermore, if the installation is located in a backward country, the operators may be drawn from the native population and, therefore, be relatively unskilled, and may work with a minimum of supervision. Under these conditions, it is often possible for an alarm to be sounded and, yet, because of the lack of experience and knowledge, the operators may be unable to cope with the emergency with a possibility of disastrous results. Attempts to solve these problems have resulted in the development of control units which automatically shut off the particular unit which was malfunctioning or indicate which channel is errant, but they do not shut off the power source for the control system. Systems which cause the closing of a circuit upon malfunctioning of a channel may result in a constant drain on the power source and if the power source is a battery, such as is common in remote areas, the battery may run down and any indicating mechanism run therefrom would not function.

The present invention provides a digital type annunciator system which immediately shuts down an electric motor or engine driven unit in response to a fault occurring in one of a number of monitored primary control units. These control units may monitor temperature, pressure, liquid level, or any other condition associated with the power source and the equipment driven therefrom. These primary control units should be of the type that close a circuit when trouble occurs rather than the type which opens a circuit. When a malfunction is detected by one of the primary control units, a circuit is closed to energize a motor selector switch which is intermittently interrupted by a selft-actuated switch. The selector switch is successively energized until a pointer driven by the selector switch cooperates with adjacent indicia to indicate which control unit has detected the malfunction. Then, immediately, the motor selector switch is disconnected from its power supply and the ignition of the internal combustion engine driving the unit is grounded. Also, a solenoid is energized which closes a valve controlling the flow of fuel to the engine and as the valve closes a limit switch opens the solenoid circuit. Thus, the digital annunciator panel provides two immediate and positive automatic means for shutting down a unit in an emergency, an indication of the malfunction, and a complete disconnection from its own power supply.

It is important in applications, such as a natural gas pumping station, that an internal combustion engine be shut down as quickly as possible when an emergency arises, since a spark from the ignition of the engine might ignite the gas. A delay of one second might make a very important difference between a safe shut down and a disaster so the grounding of the engine's ignition as provided in this invention precludes the hazard of the engine's ignition even though the engine has not come completely to rest.

Since the annunciator system operates almost instantaneously to indicate a fault as it happens and then disconnects the indicating mechanism from the circuit, the true fault is shown by the indicator rather than other conditions which may become abnormal when the unit is shut down.

When a battery power supply is used for the annunciator system, a D.C. voltmeter may be provided in the annunciator system so that a dummy load which substantially simulates the actual load of the annunciator system may be placed on the battery to test its condition. This testing may be done by depressing a spring loaded switch on the front of the panel.

A principal object of the present invention is to provide an annunciator system particularly designed and constructed to indicate which one of a plurality of monitored channels has detected a malfunction.

Another object of the present invention is to provide a novel annunciator system which will continue to indicate a malfunction after its own power supply has been disconnected.

Still another object of the present invention is to provide a novel annunciator system which will automatically shut down a power source when a fault occurs in one of a plurality of control units associated with the power source.

And yet another object of the present invention is to provide an annunciator system which will automatically disconnect its own power supply after momentary use immediately following a fault in one of a plurality of supervised channels.

A still further object of this invention is to provide a novel annunciator system that will enable an attendant to test the condition of the annunciator power supply.

And yet a still further object of this invention is to provide a novel digital annunciator system which normally is in an open circuit condition, but when an emergency arises is energized only momentarily to interrupt the operation of a power source and also to disconnect itself from its own power supply.

Other objects and advantages of the invention will be evident from the following detailed description, read in conjunction with the accompanying drawings, which illustrate my invention.

Figure 1:
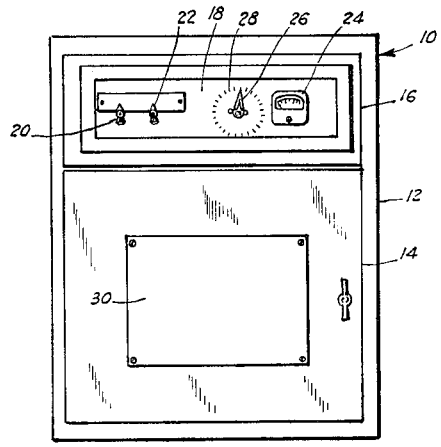
FIGURE 1 is a front elevational view of a digital annunciator panel enclosing the system of the present invention.

Referring to the drawings in detail, reference character 10 generally designates the digital annunciator panel for emergency shut down of a power source such as an internal combustion engine (not shown). The digital annunciator panel 10 comprises a housing 12 that may be flush mounted in a wall or panel mounted. A door 14 is provided for closing the lower portion of the housing 12, and a cover 16 containing an aperture or window 18 is secured to the housing 12 so as to close the upper portion of the housing 12. A plurality of control and testing switches are visible and accessible through the window 18. Switch 20 is provided to control the operation of the annunciator panel 10 and is movable or rotatable to a plurality of settings. The switch 20 may be used to effect an emergency shut down of an engine driven unit, or the resetting of the annunciator mechanism prior to starting the engine unit, as well as removing the annunciator mechanism from operation momentarily while the engine is started. The switch 20 is also movable to a position during the operation of the unit 10 which will provide means for immediate shut down of the unit should an abnormal condition develop. Switch 22 allows the condition of the direct current power supply of the annunciator system to be tested. A voltmeter 24 shows the strength of the panel 10 power supply when a dummy load is placed on the power supply by actuation of the switch 22 in a manner that will be hereinafter set forth. A pointer 26 cooperates with adjacent indicia 28 to indicate which of a plurality of supervised control units has detected the development of an abnormal condition, the operation of which will hereinafter be set forth more fully. A panel 30 may be secured to the door 14 to specify to which of the control units the indicia 28 refers.

Figure 2:
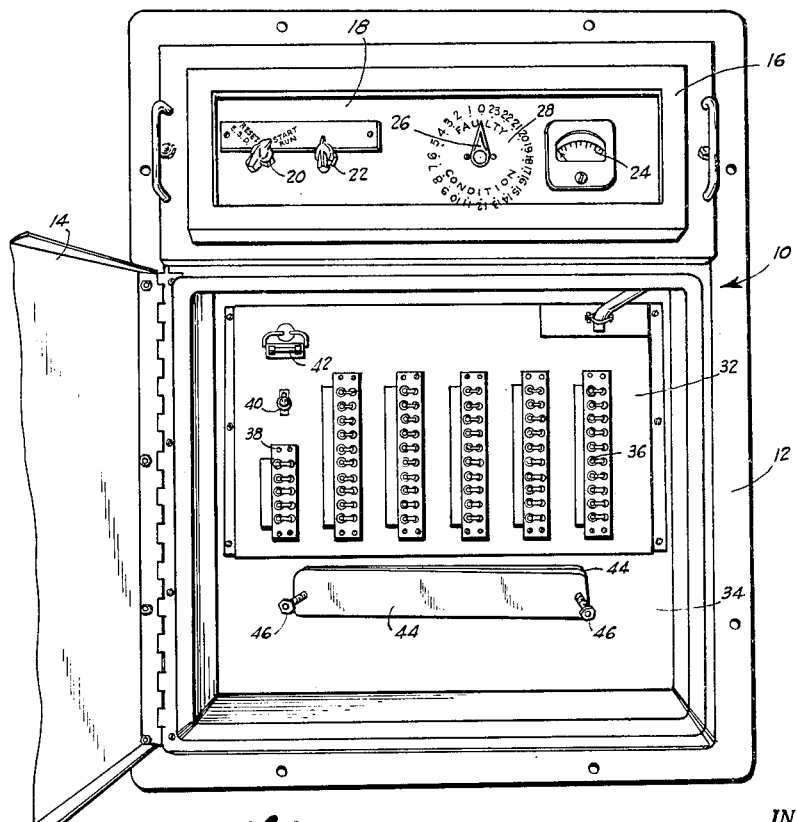
FIGURE 2 is a perspective view of the digital annunciator panel depicting the door in an open position for purposes of illustration.

FIGURE 2 shows the digital annunciator panel 10 when the door 14 has been opened to expose the interior of the housing 12. A panel 32 is fixedly secured to the back wall 34 of the housing 12 to receive a plurality of terminals 36 which are connected to the individual control units (not shown). A plurality of terminals 38 are shown secured to the panel 32 to the left of terminals 36 and are connected to the magnetos of the engine (not shown). A switch 40 is provided to connect the annunciator mechanism to a power supply for operation. A fuse 42 is provided to interrupt the operation of the digital annunciator 10 if one of its components should fail. Rectangular members 44 cooperate with bolts 46 to hold a battery (not shown) in place in the lower portion of the housing 12.

Figure 3:
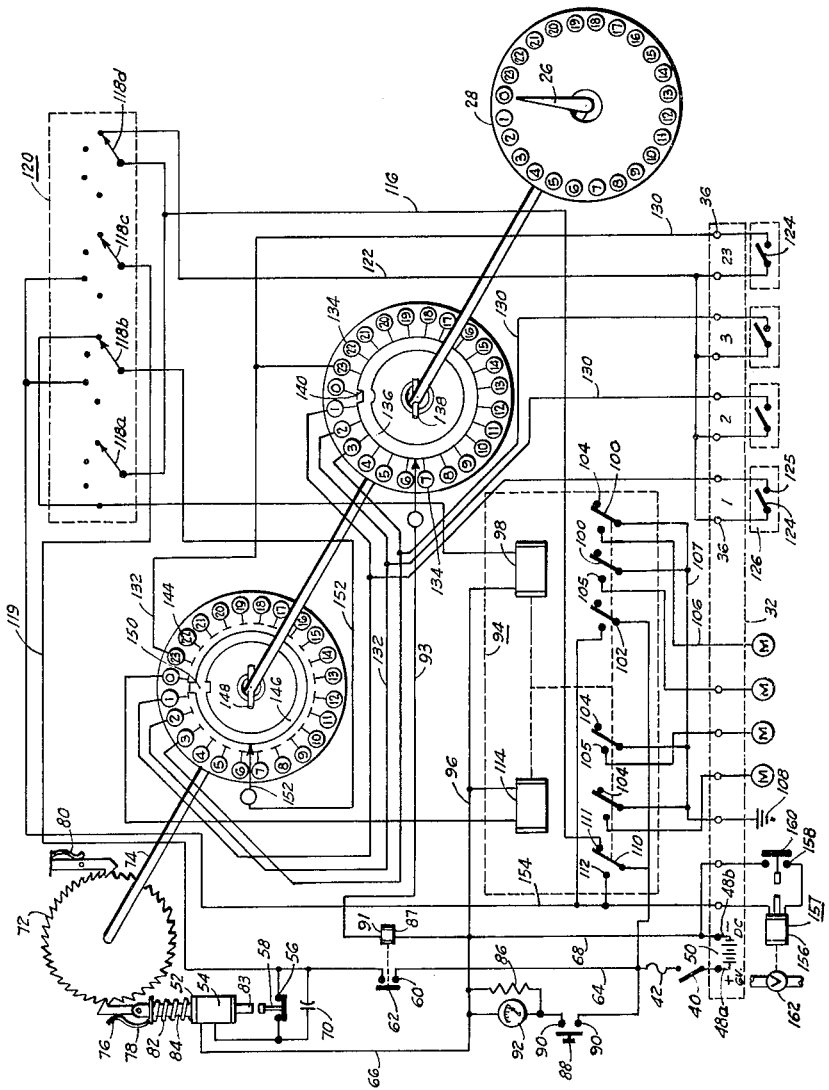
FIGURE 3 is a circuit diagram of an annunciator system incorporating features of this invention.

A pair of power lines 48a and 48b are shown coming from a power supply 50 which is shown in FIG. 3 as being a 6 volt battery. Although the power supply 50 is shown as being direct current, the digital annunciator 10 could be operated on 115 alternating current or other values of direct current if appropriate changes were made in the ratings of the components used in the annunciator panel 10 and the use of a 6 volt battery is not to be construed as a limitation thereto. One side of the coil 52 of a conventional solenoid stepping switch or motor selector switch 54 is connected across the terminals 56 of a spring loaded normally closed switch 58, the terminals 60 of a normally open solenoid switch 62, and a conductor 64 to one side 48a of a direct current power source 50. The fuse 42 and the switch 40 are also interposed in the conductor 64. The other side of the coil 52 is connected to the other line 48b of the power source 50 through conductors 66 and 68. A condenser 70 is connected across the terminals 56 of the switch 58.

The motor selector switch 54 comprises a ratchet wheel 72 that is mounted on or keyed to a shaft 74. A pawl 76 for actuating the wheel 72 is normally held engaged with a tooth on the wheel 72 by a leaf spring 78. To prevent any possible reversed rotation of the shaft 74 as pawl 76 rides up a tooth side on wheel 72, a spring pressed pawl 80 may be pivotally supported for engagement with ratchet wheel 72 on the side opposite pawl 76. The plunger 82 is drawn within the coil 52 when the coil 52 is energized. As the plunger 82 moves into the coil 52, a portion 83 of the plunger extends from the other side of the coil 52 and moves the switch 58 away from the contacts 56, thereby breaking the power circuit of the selector switch 54. The spring 84 that surrounds the plunger 82 and which is secured thereto moves the plunger 82 upwardly from within the coil 52 when the power circuit of the coil 52 is broken, thus allowing the spring loaded switch 58 to reclose the terminals 56 and to re-energize the coil 52. As long as the switch 62 remains closed, the solenoid stepping switch will intermittently energize itself through the counter-action of the spring loaded plunger 82 and the switch 58 and will intermittently rotate shaft 74 a predetermined increment each period of energization. The stepping switch 54 is of conventional form and one that is commonly used to drive selector switches.

A dummy load 86 may be placed across the power supply 50 by depressing a spring loaded switch 88 across the terminals 90, thereby connecting the resistor 86 across conductor 64 and conductor 68. An indication of the condition of the battery 50 is given by a voltmeter 92 showing the voltage developed across the load 86. The voltmeter 92 is connected across the dummy load 86 which approximates the total load that the digital annunciator 10 places across the battery 50.

The coil 87 of solenoid 91 is connected to line 48b of the battery 50 on one side through conductor 68 and is connected on the other side to conductor 93. When the coil 87 is energized, it acts to close switch 62 across terminals 60 in conductor 64 thereby energizing the stepping switch 54.

A double throw relay 94 is connected to the battery 50 through a conductor 96. The operating winding 98 of relay 94 is mechanically connected to the movable switch arms 100 of the double throw switches 102 shown contacting terminals 104 in a normal run position. When the winding 98 is energized, the switch arms 100 are moved into contact with contacts 105. The magnetos M of an engine, which are connected to the movable switch arms 100 through conductors 106, are then grounded through conductor 107 to a ground 108 thereby shutting off the ignition of the engine (not shown).

Also, switch arm 110 is controlled by the operating winding 98. The main flow of current through the annunciator 10 is normally through switch 110 which is connected to conductor 64 and terminal 111. When the winding 98 is energized, the switch arm 110 is moved into contact with terminal 112 in order to energize an engine shut down device which will be more fully explained hereinafter. The solenoid winding 114 is connected in ganged mechanical relation to switches 100 and 110. When the winding 114 is energized, the switches 100 and 110 are movable to the position shown in the drawings, or in other words, winding 114 is used to reset the switches 100 and 110 after they have been thrown by the energization of winding 98. The winding 114 is connected at one end to conductor 96.

Conductor 116 is connected at one end to terminal 111 to receive current from the battery 50 and at the other end to switch arms 118 of a ganged control switch 120 which is positioned by the exterior switch 20. Current can flow through the switch arm to conductor 122 which is connected to a plurality of danger condition responsive means shown illustratively as switches 124 enclosed in dotted boxes 126. The movable switch arms 124 contact the fixed terminals 125 when a dangerous condition arises, thereby allowing current to flow from conductor 122 across the switch 124, terminal 125 and then through conductor 130.

So as not to unduly encumber the wiring diagram with a repetition of the identical switch means 124, the first three control units 124 and the twenty-third control unit 124 are shown. Of course, the number of control units shown in the drawings is not to constitute a limitation on the invention, but is only shown for purposes of illustration.

The control switches 118 are shown in a run position, but they are also manually movable by handle 120 to an emergency shut down position if trouble should develop while an attendant was in the vicinity and it was desirable to immediately shut the unit down. The switches 118 are also movable to a reset position in order to reset the panel mechanism 10 after the unit has been shut down either automatically or by movement of the switches 118 to the emergency shut down position. The switches 118 are moved to a start position after the mechanism 10 has been reset to remove the mechanism 10 from operation momentarily while the unit is started. If the unit is shut down, the monitored conditions would, of course, be abnormal at starting and it is necessary to momentarily remove the digital annuciator from operation to preclude its operation immediately as it detects the abnormal conditions prevalent on starting.

The conductors 130 are connected to conductors 132 which are in turn connected to a plurality of fixed contacts 134 of the motor selector switch 54. The terminals 134 are arranged to be contacted by an annular conductor 136 which is fixed through insulating means 138 to shaft 74 of the selector switch 54. There is a gap 140 in the outer periphery of the conductor 136 which comes to rest opposite a contact 134 as the shaft 74 is successively rotated predetermined increments. When a fault occurs in one of the monitored channels 124, current flows through a conductor 130 via conductor 132 into one of the contacts 134, and then into conductor 136. From conductor 136 current flows through conductor 93 which is in continuous contact with the conductor 136 into the solenoid 91 which closes switch 62 energizing the steeping switch 54. The stepping switch 54 is energized momentarily to rotate the shaft 74 and the connected conductor 136 a predetermined increment. Each time the shaft 74 is rotated a certain amount, the gap 140 comes to rest opposite one of the contacts 134 and if the control unit 126 that is detecting the malfunction is connected to this contact 134, current is precluded from continuing to flow through the switch energizing the motor selector switch 54. However, if the contact 134 that is isolated by the gap 140 in the conductor 136 is not the one that is malfunctioning, then the motor driven selector switch 54 is repeatedly energized until the correct contact is located. As soon as the correct contact 134 is located, the selector switch 54 is completely de-energized until it is reset since there is no other path than conductor 93 for closing the switch 62 to energize the solenoid motor 54.

The conductors 132 are also connected to a plurality of terminals 144 which are circularly arranged around an annular conductor 146 which is connected through insulating means 148 to the shaft 74 of the motor selector switch 54. The annular conductor 146 has an integral wiper arm 150 extending radially outwardly that is arranged to sweep the contacts 144 as the shaft 74 is rotated. The number of contacts 144 and contacts 134 are equal to the number of teeth in the ratchet wheel 72 so that as the ratchet wheel 72 is intermittently engerized by the solenoid motor 54, the wiper arm 150 successively comes into contact with the individual contacts 144. A conductor 152 is in continuous contact with the conductor 146 and is also connected through a switch arm 118 to one side of the winding 98 of the relay 94.

Since current cannot flow through the conductor 146 until the wiper arm 150 contacts the terminal 144 which leads through conductor 132 to the malfunctioning channel 126, the winding 98 remains unenergized until the wiper arm 150 contacts the correct terminal 144. When winding 98 is energized and the switch 110 moved to contact 112, current from the battery 50 flows from conductor 48a through conductor 154 to one side of a solenoid 156. The other side of the solenoid 156 is connected through terminals 158 that are closed by switch 160 to the other side of the battery 50. When the solenoid 156 is energized, it actuates two devices. First, it closes a valve 162 which controls the flow of fuel to an engine (not shown) and, secondly, it opens a normally closed limit switch 160 (shown in FIGURE 3 in its open position for purely illustrative purposes) as the valve 162 is closed. Thus, the digital annunciator operates in two ways to immediately and positively shut down an engine when one of a plurality of monitored conditions associated with the engine is detected as registering an abnormal value. The magneto ignition of the engine is immediately grounded and the fuel to the engine is shut off. As these acts are completed, the mechanism completely disconnects itself from the battery 50 so that there is only a momentary use of the battery 50 when an emergency occurs and the life of the battery 50 is essentially its shelf life. Although the digital annunciator 10 is shown as grounding the ignition and cutting off the fuel supply of an internal combustion engine, it is within the scope of this invention to provide means to disconnect an electric motor in an emergency instead of an internal combustion engine.

An indication of the control unit 124 which has detected a faulty condition is furnished by the indicator 26 that is driven by the shaft 74 of the motor selector switch 54 and which cooperates with indicia 28 arranged around the shaft 74 to indicate the faulty channel 124. When an emergency occurs, the pointer 26 is successively moved from indicia 28 to indicia 28 until the motor selector switch 54 in cooperation with the two banks of contacts 134 and 144 has detected the faulty channel. The pointer 26 then rests at that indicia 28 as the motor selector switch is totally disconnected from the battery 50. The pointer remains locked in this position until the panel mechanism 10 is reset by an attendant operating the control switches 118 through switch 20 to the reset position.

*Operation*

Assuming that the control switches 118 are set in a run position and that an internal combustion engine is the power source to be controlled, current flows from the positive side of the battery 50 along conductor 48a, through the switch 40 and the fuse 42, through the switch arm 110 to terminal 111, thence along conductor 116 to the switch arm 118, and then along conductor 122 to terminal 36 and one of the control unit switches 124.

If the engine and the associated mechanisms are operating properly, then all the switches 124 will be open and the current from the battery 50 will not be permitted to flow further due to the open circuits presented. When all the monitored conditions are functioning properly, there is no drain on the battery 50 since there can be no flow across the open control unit switches 124 and the normally open switches 62 and 88 prevent current flow in any other part of the circuit.

If a monitored condition, such as the water jacket temperature, rises above normal, the switch arm 124 is closed against contact 125 thus allowing the current to flow through conductor 130 to conductor 132 and to contacts 134. The conductor 136 is in contact with the terminal 134, thus providing a path for the current along conductor 93 to the coil 87 of the solenoid switch 91 from where it flows along line 68 to the other side of the battery 50. Energization of the coil 87 closes the connected switch 62 to permit current to flow from the direct current power supply 50 along line 64, across the switch 58, coil 52, line 66 and conductor 68 to the other side of the power supply 50. Energization of the coil 52 pulls the plunger 82 into the coil 52, thereby causing the pawl 76 to rotate the wheel 72 a predetermined increment. As the plunger 82 descends into the coil 52, the portion 83 of the plunger 82 opens the switch 58 to de-energize the coil 52. When the coil 52 is de-energized, the spring 84 forces the plunger 82 into its former position and allows the spring loaded switch 58 to reclose, thus reinitiating the cycle of operation of the solenoid motor 54.

The solenoid motor 54 continues to be repeatedly energized and to rotate the annular conductor 136 until the gap 140 in the conductor 136 is rotated into position opposite the contact 134 which leads to the malfunctioning channel. The circuit to the motor selector switch 54 is then broken, since the coil 87 is de-energized to allow the normally open switch 62 to open. The pointer 26 now points to the indicia 28 which identifies the control unit 124 which has detected a malfunction. Since the shaft 74 is locked in position by the cooperation of pawls 80 and 76 with the wheel 72, the pointer 26 remains in this position until the annunciator panel mechanism is reset by an attendant. As the selector switch 54 is repeatedly energized to drive the annular conductor 136 until the faulting channel is detected, the integral wiper arm 150 of annular conductor 146 is simultaneously swept over the conductors 144.

The teeth of wheel 72, contacts 144, and contacts 134 are of equal number and arranged with respect to the shaft 74 so as to cooperatively perform their individual functions. When the shaft 74 is brought to rest in a position dictated by the selector switch 54, current flows from conductor 130, along line 132 to terminal 144, across the wiper arm 150 to conductor 146, conductor 152, switch arm 118b, winding 98, thence to conductor 68 and the other side of the power supply 50. When the winding 98 is energized, the switches 100 are moved into contact with terminals 105 to connect the magnetos M of the engine's ignition system to a ground 108, thus interrupting the operation of the engine. Switch arm 110 is also moved into contact with terminal 112 by energization of the winding 98, thereby interrupting the flow of current through conductor 116 which in turn supplies current to most of the annunciator mechanism circuit 10. Opening of the conductor 116 thus de-energizes the greater part of the circuit 10.

Current then flows from terminal 112 to the coil 157 of the solenoid 156, across switch 160 through contacts 158, and thence to the battery 50. Energization of the coil 157 acts to close the valve 162 which controls the flow of fuel to the engine. Thus, the energization of the winding 98 positively shuts the engine down by both grounding the ignition and shutting off its fuel supply. Energization of the coil 157 also opens a limit switch 160 which de-energizes the coil 157 and accordingly leaves the annunciator 10 circuit completely disconnected from the battery 50.

An emergency shut down of the engine may be effected by the movement of the control switches 118 to the emergency shut down position from the run position. Switch 118a connects conductor 116 to the winding 98 for energization thereof. Energization of the winding 98 acts to interrupt the operation of the engine in a manner previously described.

Assuming that it is necessary to reset the annunciator mechanism 10 because the engine was shut down automatically or because the control switch 118 was moved to the emergency shut down position, an attendant initially moves the control switch 118 to the reset position. Current flows across switch arm 110 and through conductor 154 to switch arms 118b and 118c, via conductor 119 to the solenoid stepping switch 54, and then along conductors 66 and 68 to the other side of the battery 50. Energization of the selector switch coil 52 causes the shaft 72 to rotate the wiper arm 150 in successive steps until it reaches the terminal 144 that does not designate a control unit or which is the homing point for the indicator 26. Current then flows through switch 118b, conductor 152, conductor 146, coil 114, and then via conductors 96 and 68 to the battery 50. The energization of the coil 114 moves the switch arm 110 from terminal 112 to terminal 111 and the switch arms 100 from terminal 105 to 104. The annunciator circuit 10 is now in a run position with the exception of the valve shut off mechanism 156 which must be manually reset to complete the clearing operation for restarting of the engine.

To restart the engine, the switches 118 are moved to the start position which temporarily interrupts the operation of the system while the engine is started. If this were not done, the system would instantly ground the ignition and shut off the fuel of the engine when it detected the abnormal conditions which are, of course, present upon restarting of the engine.

From the foregoing, it is apparent that the present invention provides a digital annunciator system which monitors a plurality of conditions associated with an engine driven unit and when an emergency develops acts immediately to interrupt the operation of the engine. The annunciator system also indicates which condition has become abnormal, as well as completely disconnecting itself from its power supply after the engine has been shut down and the faulty condition indicated.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. In combination, a normally non-energized control system comprising, a power source, a plurality of condition responsive means normally in an open circuit condition and operable to a closed circuit condition by the malfunction of a condition; scanning means for scanning each condition responsive means, means electrically connecting said scanning means and said condition responsive means and said power source in a normally open circuit and including control means operable to energize said scanning means by the closing of a particular condition responsive means whereby said scanning means is advanced to a position indicating said particular condition responsive means, and electrical means operated by the advanced position of said scanning means effecting said control means to turn-off the power source from the entire system.

2. A control system for an internal combustion engine comprising a plurality of control units monitoring preselected conditions associated with said engine, each of said control units being of the type which closes a circuit therein when a malfunction occurs in its associated monitored condition; a movable conductor having a gap in its outer periphery; a plurality of fixed contacts arranged around the periphery of said conductor and in contact therewith except for any contact which is disposed opposite said gap; an electrical power supply; means connecting said conductor to one side of said power supply; means connecting each of said fixed contacts individually to one side of each of said control units; means connecting the other side of each of said control units to the other side of said electrical power supply, said conductor in its initial position having its gap opposite a reference position which is not in contact with any of said fixed contacts; whereby, prior to the occurrence of any malfunction no power is consumed from said electrical power supply, and whereby, when a malfunction occurs in a particular one of said monitored conditions, the associated control unit provides a closed circuit from one side of said power supply through said conductor, through the fixed contact associated with the particular control unit, and through the particular control unit to the other side of said power supply; means responsive to the completion of the aforementioned closed circuit resulting from the actuation of said particular control unit for moving said conductor until said gap is moved to a position opposite from the fixed contact associated with said particular control unit thereby interrupting the aforementioned circuit so as to stop the movement of said conductor; indicating means movable in response to the movement of said conductor for indicating, when said conductor comes to rest, the particular monitored condition wherein the malfunction occurred; and means responsive to the movement of said conductor for turning off said internal combustion engine.

3. A normally non-energized control system for an internal combustion engine comprising a plurality of control units monitoring preselected conditions associated with said engine, each of said control units being of the type which closes a circuit therein when a malfunction occurs in its associated monitored condition; a rotatable annular conductor having a gap in its outer periphery, a plurality of fixed contacts arranged around the periphery of said annular conductor and in contact therewith except for any contact which is disposed opposite said gap; an electrical power supply; means connecting said annular conductor to one side of said power supply; means connecting each of said fixed contacts individually to one side of each of said control units; means connecting the other side of each of said control units to the other side of said electrical power supply, said annular conductor in its initial position having its gap opposite a reference position which is not in contact with any of said fixed contacts; whereby, when a malfunction occurs in a particular one of said monitored conditions, the associated control unit provides a closed circuit from one side of said power supply through said annular conductor through the fixed contact associated with the particular control unit, through the particular control unit to the other side of said power supply, means responsive to the completion of the aforementioned circuit resulting from the actuation of said particular control unit for rotating said annular conductor until said gap is moved to a position opposite from the fixed contact associated with said particular control unit thereby interrupting the aforementioned circuit, indicating means movable in response to the rotation of said annular conductor for indicating the particular monitored condition wherein the malfunction occurred, and means responsive to the rotation of said annular conductor for turning off said internal combustion engine and for disconnecting said elcetrical power supply completely from said control system.

4. A control system for an internal combustion engine comprising a plurality of control units monitoring preselected conditions associated with said engine, each of said control units being of the type which closes a circuit therein when a malfunction occurs in its associated monitored condition; a first rotatable conductor having a substantially circular periphery except for a gap therein, a first plurality of fixed contacts arranged around the periphery of said first conductor and in contact therewith except for any contact which is disposed opposite said gap; a second rotatable conductor mounted for rotation coaxially with said first conductor and having a wiper arm projecting radially outward therefrom; a second plurality of fixed contacts arranged concentrically around said second conductor so as to be contacted individually and successively by said wiper arm as said second conductor is rotated; means connecting each contact of said first plurality of fixed contacts with a corresponding contact of said second plurality of contacts and with one side of each of said control units; an electrical power supply; means connecting one side of said power supply to said first conductor; a relay; a switch operated by said relay; means connecting the other side of each of said control units to the other side of said electrical power supply through said switch, means connecting said one side of said electrical power supply to said second conductor through said relay, said first conductor in its initial position having its gap opposite a reference position which is not in contact with any of said fixed contacts, an indicating device having indicia thereon, a pointer mounted for rotation coaxially with said first and second conductors and movable with respect to said indicating device so as to point to individual indicia thereon, means for rotating said first and second conductors and said pointer in keyed relation whereby said gap and said wiper arm will be opposite fixed contacts, respectively, leading to the same control unit, whereby, when a malfunction occurs in a particular one of said monitored conditions, the associated control unit provides a closed circuit from one side of said power supply through said first conductor through the fixed contact of said first plurality of associated with the particular control unit, through the particular control unit and through the switch to the other side of said power supply, means responsive to the completion of the aforementioned closed circuit resulting from the actuation of said particular control unit for rotating said conductors and said pointer until said gap of said first conductor is moved to a position opposite from the fixed contact associated with said particular control unit thereby interrupting the aforementioned circuit through said first conductor and whereby the associated control unit provides another closed circuit from one side of said power supply through said relay through said second conductor through said wiper arm and the fixed contact of said second plurality associated with the particular control unit through the particular control unit through the switch to the other side of said power supply, thereby energizing said relay to open said switch and stop the rotation of said first and second conductors and said pointer, said pointer coming to rest opposite the indicia corresponding to the particular monitored condition in which the malfunction occurred, and means responsive to the actuation of said relay for turning off said internal combustion engine and for disconnecting said electrical power supply completely from said control system.

5. A control system for an internal combustion engine having a fuel supply and a magneto system comprising a plurality of control units monitoring preselected conditions associated with said engine, each of said control units being of the type which closes a circuit therein when a malfunction occurs in its associated monitored condition, a first rotatable conductor having a substantially circular periphery except for a gap therein, a first plurality of fixed contacts arranged around the periphery of said first conductor and in contact therewith except for any contact which is disposed opposite said gap, a second rotatable conductor mounted for rotation coaxially with said first conductor and having a wiper arm projecting radially outward therefrom, a second plurality of fixed contacts arranged concentrically around said second conductor so as to be contacted individually and successively by said wiper arm as said second conductor is rotated, means connecting each contact of said first plurality of fixed contacts with a corresponding contact of said second plurality of contacts and with one side of each of said control units, an electrical power supply, means connecting one side of said power supply to said first conductor, a relay, a switch operated by said relay, means connecting the other side of each of said control units to the other side of said electrical power supply through the normally closed contacts of said switch, means connecting said one side of said electrical power supply to said second conductor through said relay, said first conductor in its initial position having its gap opposite a reference position which is not in contact with any of said fixed contacts, an indicating device having indicia arranged circumferentially thereon, a pointer mounted for rotation coaxially with said first and second conductors and movable with respect to said indicating device so as to point to individual indicia thereon, means for rotating said first and second conductors and said pointer in keyed relation whereby said gap and said wiper arm will be opposite fixed contacts, respectively, leading to the same control unit while said pointer will be disposed opposite indicia corresponding to the said control unit, whereby, when a malfunction occurs in a particular one of said monitored conditions, the associated control unit provides a closed circuit from one side of said power supply through said first conductor through the fixed contact of said first plurality associated with the particular control unit, through the particular control unit and through the switch to the other side of said power supply, means responsive to the completion of the aforementioned closed circuit resulting from the actuation of said particular control unit for rotating said conductors and said pointer until said gap of said first conductor is moved to a position opposite from the fixed contact associated with said particular control unit thereby interrupting the aforementioned circuit through said first conductor and whereby the associated control unit provides another closed circuit from one side of said power supply through said relay through said second conductor through said wiper arm and the fixed conductor of said second plurality associated with the particular control unit through the particular control unit through the switch to the other side of said power supply, thereby energizing said relay to open said switch and stop the rotation of said first and second conductors and said pointer, said pointer coming to rest opposite the indicia corresponding to the particular monitored condition in which the malfunction occurred, a valve for controlling the fuel supply to said engine, means for grounding said magneto system, and means responsive to the actuation of said relay for closing said valve to interrupt the supply of fuel to said internal combustion engine, for actuating said grounding means to ground said magneto system, and for disconnecting said electrical power supply completely from said control system.

References Cited by the Examiner

UNITED STATES PATENTS

| | | | |
|---|---|---|---|
| 1,450,563 | 4/23 | Powell | 340—248 |
| 1,659,045 | 2/28 | Nelson | 340—248 |
| 1,797,976 | 3/31 | FitzGerald | 340—248 |
| 1,856,172 | 5/32 | Schimpf | 317—25 |
| 1,863,583 | 6/32 | Schimpf | 317—25 |
| 2,449,304 | 9/48 | Lamb | 340—213 |
| 2,578,447 | 12/51 | Odell et al. | 340—213 |
| 2,736,009 | 2/56 | Barnickel | 318—490 |
| 2,786,988 | 3/57 | Bergman | 340—213 |
| 2,799,846 | 7/57 | Negrin et al. | 340—253 XR |

NEIL C. READ, *Primary Examiner.*

E. JAMES SAX, *Examiner.*